United States Patent Office 2,714,120
Patented July 26, 1955

2,714,120

METHOD OF PREPARING ARALKYLATED PHENOLIC COMPOUNDS

Henry J. Kehe, Akron, Ohio, assignor to The B. F. Goodrich Company, New York, N. Y., a corporation of New York No Drawing. Application May 23, 1950, Serial No. 163,808

6 Claims. (Cl. 260—619)

This invention relates to the preparation of aralkylated phenolic compounds and more specifically pertains to improvements in the method of preparing such compounds by the condensation of an aryl-substituted alkene hydrocarbon with a phenol.

Heretofore aralkylated phenolic compounds have been prepared by the condensation of phenols with aryl-substituted alkene hydrocarbons such as styrene and alpha-methyl styrene using, as condensation catalysts, such powerful catalysts as anhydrous aluminum chloride, boron trifluoride, concentrated sulfuric acid, and phosphoric acid or hydrogen halide catalysts such as hydrogen chloride or hydrogen bromide eiher per se or in aqueous solution. The yields of aralkylated phenolic compounds obtained when using the powerful catalysts have been quite low due to formation of by-products, polymerization of the alkene hydrocarbon and other factors. Higher yields are said to be secured when hydrogen halide catalysts are used but it has been my experience that such catalysts likewise produce low yields. In addition the products obtained using these known catalysts are often badly discolored and are otherwise not completely satisfactory for some uses, particularly for use as rubber antioxidants as disclosed in my copending application Serial No. 163,806 filed May 23, 1950, now Patent No. 2,670,340.

I have discovered that nuclear aralkylated phenolic compounds can be prepared in high yields without any of the above-mentioned disadvantages by condensing a phenolic compound with an aryl-substituted alkene hydrocarbon in the presence of either dilute aqueous sulfuric acid or a hydrocarbon sulfonic acid, as the condensation catalyst.

The condensations carried out according to this invention progress smoothly to substantially 100% completion without violence and without substantial formation of by-products. Best results are secured when operating at atmospheric pressure and when the temperature of the reacting mixture is maintained at or about (within ±20° C. of) the boiling point of the most volatile component of the reaction mixture, which is generally the hydrocarbon reactant and possesses a boiling point of 140° C. to 200° C. Hence a satisfactory operating temperature range is generally from 120° C. to 220° C. when operating at atmospheric pressure. Temperatures as high as 300° C. can be employed when the condensation is carried out at pressures in excess of atmospheric pressure. Temperatures as low as 50° C. can also be used when the reaction is effected in presence of a low-boiling inert solvent or diluent (as is sometimes desirable if the phenolic reactant is a solid), it being understood that temperature is not a critical factor in the invention.

The amount of catalyst to be used according to this invention is quite small. In general an amount of catalyst from 0.01 to 5% by weight of the hydrocarbon reactant is employed with the preferred amount being ½ to 2 parts by weight for each molar part by weight of the hydrocarbon reactant.

In the preferred range of the catalyst, one to two pounds of the catalyst for each pound mole of the hydrocarbon reactant or one to two grams of the catalyst for each gram mole of the hydrocarbon reactant are the particularly preferred proportions of the catalytic materials to be used.

The condensation process of this invention is preferably carried out in the following manner. The catalyst and the phenolic compound (or a solution thereof in an inert solvent) are added to a reaction vessel equipped with a stirrer, a reflux condenser open to the atmosphere, a charging line, and means for heating and cooling the reaction mixture. The phenolic compound and the catalyst are heated to the reaction temperature and then the hydrocarbon reactant is added slowly to the reactor with stirring during which time the temperature is maintained at the desired reaction temperature. The resulting reaction mixture is then cooled, diluted with an inert liquid such as benzene if necessary to reduce its viscosity, and then washed free of acid with an aqueous solution of an alkali such as sodium carbonate. The resulting washed mixture is distilled at atmospheric pressure to remove diluents, unreacted hydrocarbon and unreacted phenol, if any of these are present, and the distillation is then continued at reduced pressure to recover the condensation product. The nuclear aralkylated phenolic compounds formed during the condensation reaction can be recovered in a single fraction consisting generally of a mixture of individual compounds or, if desired, substantially pure individual compounds can be recovered by further fractionation at reduced pressure.

The sulfonic acids which can be employed as condensation catalysts according to this invention possess the structure R—SO₃H where R is hydrocarbon and include, for example, such aryl sulfonic acids as benzene sulfonic acid, toluene sulfonic acids, xylene sulfonic acids, ethylbenzene sulfonic acid, mesitylene sulfonic acid, pseudocumene sulfonic acid and alpha- and beta-naphthalene sulfonic acids and such alkane sulfonic acids as ethane sulfonic acid, methane sulfonic acid, propane sulfonic acid, butane sulfonic acid and the like. In addition, dilute aqueous sulfuric acid containing from 25% to 50% by weight of H₂SO₄ can also be used as catalyst for the condensation reaction.

Among the phenolic compounds which can be employed in the condensation reaction of this invention there may be mentioned phenol, cresols, p-octyl phenol, pyrocatechol, resorcinol, hydroquinone, pyrogallol, hydroxybiphenyl, phloroglucinol, alpha-naphthol, and beta-naphthol. All these compounds possess the structure Ar—(OH)ₙ wherein Ar is an aromatic hydrocarbon radical having its connecting valences on nuclear carbon atoms, and n is an integer from to 1 to 3. Other phenols of this structure are equivalent to those specifically named and can, of course, also be used.

Any aryl-substituted alkene hydrocarbons (also called aralkylene hydrocarbons) can be employed in the condensation process of this invention. Such compounds will, of course, contain an aryl radical connected to an aliphatic carbon chain in which there is an olefinic double bond. The preferred aralkylene hydrocarbons are those of the structure

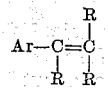

wherein Ar is aryl and R is hydrogen or alkyl among which there may be mentioned styrene, alpha-methyl styrene, alpha-ethyl styrene, p-methyl styrene, p-isopropyl styrene, p-methyl-alpha-methyl styrene, beta-methyl styrene, vinyl naphthalene and the like. Other aryl-substituted alkene hydrocarbons which may be used are 2-methallyl benzene, 2-methyl-1,1-diphenyl propene-2, allyl benzene, allylnaphthalene, 1-phenyl-propene-2 and the like.

The following specific examples wherein specific phenolic compounds and aralkylene hydrocarbons are employed as reactants will illustrate the condensation process of this invention. The term "parts" is employed in the examples to designate parts by weight.

EXAMPLE I

To a reactor equipped with a stirrer, a thermometer, a reflux condenser, means for heating and cooling its contents, and a charging line, there was added 5 parts of p-toluene sulfonic acid monohydrate and 141 (1.5 moles) parts of phenol. This mixture was heated to about 140° C. and then 312 (3 moles) parts of styrene were added over a period of two hours while the reaction temperature was maintained at 140° ± 5° C.

The reaction mixture was cooled to about 70° C., then an aqueous solution containing 5% by weight of sodium carbonate and 10% salt was added with stirring to neutralize the sulfonic acid. The reaction mixture was then diluted with 150 parts of benzene. A sharp separation between the benzene solution and the aqueous solution was obtained when the mixture of the colorless benzene and water solutions was allowed to settle.

The benzene solution was washed with water and then charged to a still pot. Benzene and entrapped water were removed by distillation at atmospheric pressure. Then the pressure was reduced slightly on the still and unreacted phenol and styrene were removed. About 8 parts of a mixture of phenol and styrene, principally phenol, were recovered. There was also about two parts of phenol in the aqueous mediums employed to neutralize the acid catalyst and to wash the benzene solution. There was no dimer or polymer of styrene present. The material remaining in the still pot, a mixture of colorless styrylated phenol compounds, was fractionated at reduced pressure. A total of 443 parts, a 98% yield, of three colorless products were obtained by this fractionation. The three products, the amount and percent of total of each product, physical properties of each product, as well as the chemical name given to each product after identification are tabulated below.

*Table I*

| Product | Amount parts | Percent | Physical Properties | Identified As— |
|---|---|---|---|---|
| I | 62 | 14.0 | Oil, B. P. 112° to 141° C. at 0.45 to 0.55 mm. | 4-(1-phenyl-1-ethyl) phenol. |
| II | 219 | 49.4 | Viscous Oil, B. P. 149° C. to 195° C. at 0.45 to 0.55 mm. | 2,4-di-(1-phenyl-1-ethyl) phenol. |
| III | 162 | 36.6 | Very Viscous Oil, B. P. 202 to 208° C. at 0.4 mm. | 2,4,6-tri-(1-phenyl-1-ethyl) phenol. |

EXAMPLE II

The process of Example I was repeated except that 5 parts of ethane sulfonic acid monohydrate were used as a catalyst. A 90% yield of a mixture of the three aralkylated phenols, the mono-, di- and tri-(1-phenyl-1-ethyl) phenols, was obtained.

EXAMPLE III

The process of Example I was repeated except that 5 parts of methane sulfonic acid monohydrate were used as a catalyst. A yield of about 90% of mixed aralkylated phenols, the mono-, di- and tri-(1-phenyl-1-ethyl) phenols, was obtained.

EXAMPLE IV 141 parts of phenol and 312 parts of styrene, a ratio of 2 moles of styrene for each mole of phenol, were condensed in the presence of 8.0 parts of 25% by weight sulfuric acid employing the same procedure as described in Example I. The resulting mixture was neutralized with aqueous sodium carbonate, diluted with benzene and washed with water. There was no difficulty experienced in separating the aqueous layer from the colorless benzene solution.

The neutralized, washed benzene solution was charged to a still pot and the benzene was distilled off at atmospheric pressure. Then the mixture in the still pot was distilled at a slightly reduced pressure and 4.3 parts of unreacted phenol was recovered. (An additional 1.9 parts of unreacted phenol was extracted by the aqueous washes.) No styrene, styrene dimer or polymer was present. The remaining mixture, 451.1 parts, a 99.6% yield was fractionally distilled at reduced pressure, from 0.4 to 0.55 mm., and three colorless products were obtained. These three products in the order of their volatility were 60.1 parts (13.5%) of 4-(1-phenyl-1-ethyl) phenol, 211.1 parts (47.2%) of 2,4-di-(1-phenyl-1-ethyl) phenol, and 175.6 parts (39.3%) of 2,4,6-tri-(1-phenyl-1-ethyl) phenol.

EXAMPLE V 141 parts of phenol and 354 parts of alpha-methyl styrene were condensed at 140±5° C. in the presence of 5 parts of p-toluene sulfonic acid monohydrate by the procedure described in Example I. The acid catalyst was neutralized with sodium carbonate, benzene was added to dilute the reaction mixture and the colorless benzene solution was washed with water as described in Example I. The benzene solution was charged into a still pot and the benzene with entrapped water was removed at atmospheric pressure. Then the distillation equipment was subjected to a slightly reduced pressure to remove unreacted phenol and alpha-methyl styrene. No phenol was recovered, but 9.0 parts of alpha-methyl styrene and 31.5 parts of dimers of alpha-methyl styrene were recovered. There remained in the distillation equipment 441 parts, a yield of 89%, of phenol aralkylated to various degrees. The components were separated and recovered by distillation at reduced pressure from 0.4 to 0.5 mm. The first fraction removed had a boiling point of 135° C. at 0.45 mm. This material crystallized on cooling to white crystals which had a melting point of 75° to 77° C. and was identified as 4-(1-phenyl-isopropyl) phenol. The second fraction had a boiling point of 180° to 185° C. at 0.5 mm., also crystallized to white crystals of a melting point of 65.5° to 67° C. This second fraction was identified as 2,4-di-(1-phenyl-isopropyl) phenol. The residue, the third component, crystallized to white crystals of a melting point of 141° to 142° C. and was identified as 2,4,6-tri-(1-phenyl-isopropyl) phenol. Of the aralkylated phenols produced by this condensation 109.3 parts (24.8%) were monosubstituted phenol, 298.6 parts (67.7%) were the disubstituted phenol and 33.1 parts (7.5%) were the trisubstituted phenol.

EXAMPLE VI

The condensation process of Example V was changed only by substituting 4 parts of 50% sulfuric acid as the catalyst in place of the toluene sulfonic acid. Otherwise the amount of reactants, the condensation reaction, reaction temperature, and the recovery steps were the same as described in Example III. A 90.5% yield, 448.3 parts of aralkylated phenol were recovered. Of this 157.2 parts or 35.1% were 4-(1-phenylisopropyl) phenol, 267 parts or 59.6% were 2,4-di-(1-phenylisopropyl) phenol, and 24.1 parts of 5.3% were 2,4,6-tri-(1-phenylisopropyl) phenol. No unreacted phenol remained after the condensation, but 25.6 parts, 7.2%, of the alphamethyl styrene were recovered as the dimer.

The above examples show that very high yields of excellent aralkylated phenol products are secured in accordance with this invention. This is not the case, however, when using the condensation catalysts heretofore known. For example when the procedure and reactants of Examples V and VI were employed using 95% concentrated sulfuric acid as catalyst, no separation of the aqueous solution and the benzene solution was possible because of formation of an emulsion due to the presence of sulfonated products. Working up of the reaction product was therefore quite difficult. Moreover, the reaction product contained only a 75% yield of aralkylated phenols, there also being present a considerable quantity of dimerized alpha-methyl styrene, as well as unreacted phenol. In addition, when the procedure and reactants of Examples I and V were employed using anhydrous aluminum chloride, boron trifluoride and hydrogen chloride respectively as catalysts, yields below 50% of aralkylated phenols were obtained. In each case large amounts of by-products were present in the condensation product and even the aralkylated phenols which were secured were so discolored as to be of considerably less value as antioxidants than the products of Examples I and V.

EXAMPLE VII 177 parts of p-cresol and 312 parts of styrene were condensed at 140±5° C. in the presence of 5 parts of p-toluene sulfonic acid employing the procedure described in Example I. The acid catalyst was neutralized with sodium carbonate and the reaction mixture was washed free of resulting sodium salts after dilution with benzene. Then the benzene solution was charged to a still pot where the benzene was distilled off at atmospheric pressures. No unreacted styrene, dimer of styrene or unreacted p-cresol distilled over when the mixture remaining after removal of benzene was heated at slightly reduced pressure. There then remained 460 parts, a yield of 94.5%, of aralkylated cresol in the distillation equipment. Of this 15.1 parts (3.2%) of an oily liquid having a boiling point of 180° to 185° C. at 0.75 mm. and identified as 2-(1-phenyl-1-ethyl)-p-cresol, 437.5 parts (92.4%) of a viscous oily liquid boiling at 189° to 190° C. at 0.75 mm. and identified as 2,6-di-(1-phenyl-1-ethyl)-p-cresol, and 8.3 parts (1.8%) of a high boiling material, tri-(1-phenyl-1-ethyl)-p-cresol, were recovered.

EXAMPLE VIII 177 parts of m-cresol and 312 parts of styrene were condensed at 140±5° C. in the presence of 5 parts of p-toluene sulfonic acid employing the procedure described in Example I. The acid catalyst was neutralized with sodium carbonate and the reaction products were diluted with benzene. The benzene solution was washed free from acid salts and then charged to a still pot where entrapped water and benzene were distilled off at atmospheric pressure. The materials remaining in the distillation equipment were subjected to reduce pressure but no m-cresol, styrene or dimer of styrene distilled off. There remained 455.6 parts, a yield of 93%, of aralkylated m-cresols. On fractionation a first fraction of 41.1 parts (9.2%) was recovered at a temperature of 175° to 183° C. at 0.75 mm. and was identified as 5-methyl-2-(1-phenyl-1-ethyl) phenol, and a second fraction of 369.4 parts (81%) was recovered at 189° to 196° C. at 0.75 mm. and was identified as 5-methyl-2,4 (or 2,6) di-(1-phenyl-1-ethyl) phenol. From the residue remaining in the still pot there were recovered 44.6 parts (9.8%) of a very viscous, high boiling material identified as 3-methyl-2,4,6-tri-(1-phenyl-1-ethyl) phenol.

EXAMPLE IX

In a similar manner 216 parts of beta-naphthol were condensed with 312 parts of styrene at 140±5° C. in the presence of 5 parts of p-toluene sulfonic acid. The yield of aralkylated naphthols after removing the catalyst and unreacted materials was 467.4 parts, a yield of 88.5%. 76 parts (16.5%) of an oily material were recovered by distillation at 184° to 187° C. at 0.8 to 0.9 mm. This material was identified as 1-(1-phenyl-1-ethyl)-2-naphthol. The remaining material, 390.6 parts (83.5%) was very viscous and high boiling and was not subjected to further distillation. By infra red absorption and ultra violet absorption it was determined that this residue was a di-aralkyl substituted naphthol but the point of substitution of the second aralkyl group, (1-phenyl-1-ethyl), was not determined.

EXAMPLES X TO XIII

These examples were carried out according to the procedure described in Example I, but the specific details have been consolidated in tabular form for simplification.

*Table II*

ARALKYLATION OF PHENOLIC COMPOUNDS

| Example No. | Reactants—Parts | | Temp., °C. | Catalyst, Parts | Components in Condensation Product, Name | Percent | Physical Properties |
|---|---|---|---|---|---|---|---|
| | Phenolic | Aralkylene | | | | | |
| X | phenol, 141 parts. | alpha, para-dimethyl styrene, 396 parts. | 140±5 | p-toluene sulfonic acid monohydrate, 5 parts. | 4-(1-p-tolylisopropyl)-phenol | 23.6 | B. P. 141°–143° C. @ 0.5 mm. |
| | | | | | 2,4-di-(1-p-tolylisopropyl) phenol | 69.7 | B. P. 150°–195° C. @ 0.5 mm. |
| | | | | | 2,4,6 - tri - (1-p-tolylisopropyl) - phenol. | 6.7 | exceedingly viscous—High boiling at 0.5 mm. |
| XI | p-cresol, 177 parts. | alpha-methyl styrene, 354 parts. | 140±5 | do | 2, - (1-phenylisopropyl) - p-cresol | 55.5 | B. P. 118°–122° C. @ 0.7 mm. |
| | | | | | 2,6 - di - (1 phenylisopropyl) - p-cresol. | 41.8 | B. P. 180°–182° C. @ 0.8 mm. |
| | | | | | 2,3,6(or 2,5,6)-tri-(1-phenylisopropyl)-p-cresol. | 2.7 | Very viscous liquid and high boiling @ 0.8 mm. |
| XII | m-cresol, 177 parts. | do | 140±5 | do | 2 - (1-phenylisopropyl) - 5-methyl phenol. | 73.6 | B. P. 123°–150° C. @ 0.75 mm. |
| | | | | | 2,4 - di - (1-phenylisopropyl) - 5 - methyl phenol. | 25.8 | B. P. 188°–197° C. @ 0.78 mm. |
| | | | | | Tri - (1-phenylisopropyl) - 5 - methyl-phenol. | 0.5 | High boiling @ 0.8 mm. |
| XIII | beta-naphthol, 216 parts. | do | 140±5 | do | 1-(1-phenylisopropyl)-2-napthol | 73 | B. P. 180°–190° C. @ 0.75 mm. |
| | | | | | Di-(1-phenylisopropyl)-2-naphthol | 27 | Very viscous oil. High boiling at 0.75 mm. |

In a like manner phenol can be condensed with 2-methallyl benzene in the presence of an arylsulfonic acid or dilute sulfuric acid (25 to 50%) to produce high yield of mono-, di- and tri-(1-phenyl-2-methyl-propyl)-phenol with little or no polymerization or dimerization of 2-methallyl benzene. Similarly mono-, di-, and tri-(1,1-diphenyl-2-methyl-propyl) phenols and cresols can be prepared by condensing phenol and cresols with 1,1-diphenyl-2-methyl-propene in the presence of p-toluene sulfonic acid, benzene sulfonic acid, naphthalene sulfonic acid or dilute sulfuric acid (25% to 50%).

Although this invention has been described by means

I claim:

1. The method of preparing aralkylated phenolic compounds which comprises condensing a phenolic compound with an aryl-substituted alkene hydrocarbon having the formula

where Ar is an aryl group and R is a member selected from the class consisting of hydrogen and alkyl groups in the presence of from 0.01 to 5% by weight of a condensation catalyst selected from the class consisting of hydrocarbon sulfonic acids and aqueous sulfuric acid of a concentration from 25% to 50% $H_2SO_4$ by weight, for each molar part by weight of said hydrocarbon.

2. The method of preparing an aralkylated phenol which comprises condensing phenol with an aryl-substituted alkene hydrocarbon having the formula

where Ar is an aryl group and R is a member selected from the class consisting of hydrogen and alkyl groups in the presence of from 0.5 to 2.0 parts by weight of an aryl sulfonic acid for each molar part by weight of said hydrocarbon.

3. The method of preparing an aralkylated phenol which comprises condensing phenol with an aryl-substituted alkene hydrocarbon having the formula

where Ar is an aryl group and R is a member selected from the class consisting of hydrogen and alkyl groups in the presence of from 0.5 to 2.0 parts by weight of dilute aqueous sulfuric acid of a concentration from 25% to 50% $H_2SO_4$ by weight for each molar part by weight of said hydrocarbon.

4. The method of preparing (1-phenyl-1-ethyl) nuclear-substituted phenols which comprises condensing phenol with styrene in the presence of from 0.5 to 2.0 parts by weight of p-toluene sulfonic acid for each molar part by weight of styrene.

5. The method of preparing (1-phenylisopropyl) nuclear-substituted phenols which comprises condensing phenol with alpha-methyl styrene in the presence of from 0.5 to 2.0 parts by weight of p-toluene sulfonic acid for each molar part by weight of said styrene.

6. The method of preparing (1-phenyl-1-ethyl) nuclear-substituted phenols which comprises condensing phenol with styrene in the presence of from 0.5 to 2.0 parts by weight of aqueous sulfuric acid of a concentration from 25% to 50% $H_2SO_4$ by weight for each molar part of weight of styrene.

References Cited in the file of this patent

UNITED STATES PATENTS

| Number | Name | Date |
|---|---|---|
| 2,014,766 | Isham | Sept. 17, 1935 |
| 2,051,473 | Evans et al. | Aug. 18, 1936 |
| 2,149,759 | Cantrell | Mar. 7, 1939 |
| 2,394,754 | D'Alelio | Feb. 12, 1946 |
| 2,432,356 | Underwood | Dec. 9, 1947 |
| 2,506,410 | Blake | May 2, 1950 |
| 2,537,337 | Fearey | Jan. 9, 1951 |

FOREIGN PATENTS

| 616,829 | Great Britain | Jan. 27, 1949 |